United States Patent [19]

Ligon

[11] Patent Number: 5,999,650
[45] Date of Patent: Dec. 7, 1999

[54] SYSTEM FOR GENERATING COLOR IMAGES OF LAND

[76] Inventor: Thomas R. Ligon, 2938 N. Madison Ave., Loveland, Colo. 80538

[21] Appl. No.: 08/756,375

[22] Filed: Nov. 27, 1996

[51] Int. Cl.⁶ ..................................................... G06K 9/46
[52] U.S. Cl. .......................... 382/191; 382/110; 382/162; 702/2
[58] Field of Search .................................. 382/191, 162, 382/100, 110; 702/3, 2; 56/237

[56] References Cited

U.S. PATENT DOCUMENTS

| | | | |
|---|---|---|---|
| 4,015,366 | 4/1977 | Hall, III | 56/237 |
| 4,227,211 | 10/1980 | Disbrow | 358/113 |
| 4,908,763 | 3/1990 | Sundberg | 364/420 |
| 5,323,317 | 6/1994 | Hampton et al. | 702/3 |

*Primary Examiner*—Jose L. Couso
*Assistant Examiner*—Anh Hong Do
*Attorney, Agent, or Firm*—Smith-Hill and Bedell

[57] ABSTRACT

An imaging system produces an accurately colored representation of any desired land portion of the Earth's surface based on its measured red and near infra-red radiation. The land's image is composed of a set of pixels, each colored to represent the color of a corresponding area of the land. In the course of generating the image, the system classifies each area of the land based on scan data produced by satellites measuring red and near-infrared radiation from each area of the land. The system associates a color with each land class and colors the image pixel corresponding to each area of the land with the color associated with its class. The system allows an operator to supply input calibration data controlling the color associated with each class. Through an iterative process of adjusting the calibration data so as to make colors in the land image produced by the system conform to known colors of representative areas of that land, the operator can make the system produce an accurately colored image of the entire land. The system also generates a color classification display illustrating how it relates color to land classification. The color classification map display helps the operator to determine how to adjust the calibration data.

23 Claims, 5 Drawing Sheets

SYSTEM FOR GENERATING COLOR IMAGES OF LAND

BACKGROUND OF THE INVENTION

1. Field of the Invention

The present invention relates in general to a system for creating accurately colored images of land areas based on limited spectral radiation data gathered by spacecraft orbiting and scanning the land, and in particular, the red and near infrared images available from present weather satellites.

2. Description of Related Art

Orbiting sensors and other imaging devices have generated large amounts of information about the Earth. Unfortunately a realistic, cloudless, true color global image of the entire Earth with sufficient resolution to identify many land features has not been produced. Satellites and aircraft have taken many high resolution photographs of portions of the Earth but such photographs are not extensive enough or sufficiently coherent to assemble an unobscured and undistorted composite Earth image. Many factors have conspired to prevent construction of a realistic composite color photographic image of the Earth. For example, much of the Earth's surface is usually obscured by clouds or haze. Even clear atmosphere increasingly obscures and distorts color and detail as the photographic view is directed away from vertical.

Various non-photographic imaging sensors have been deployed in space craft for monitoring weather and earth resources, but most such sensors provide only low resolution images or fail to scan the entire Earth. The National Oceanic and Atmospheric Administration's (NOAA) Television Infrared Orbiting Satellites (TIROS) include Advanced Very High Resolution Radiometry (AVHRR) packages scanning the entire Earth approximately twice a day to produce five sensor data streams ("Channels") imaging the earth with a resolution of about 1 kilometer. The Channel One scanner senses the intensity of light radiation in the visible red spectrum between 580 and 680 nanometers in wavelength. The Channel Two scanner covers the "near-infrared" spectrum of radiation with wavelengths between 725 and 1,100 nanometers. Channels Three to Five sense infrared portions of the spectrum. Thus the five channels carry data streams representing five different images of the Earth sampling separate parts of the red through infrared portion of the radiation spectrum. The images are pixel-based and relatively high in resolution, with each pixel of the image representing the measured radiation intensity at a spot on the Earth about 1 kilometer in diameter.

The AVHRR system was designed primarily to monitor weather and temperature patterns in the oceans and the atmosphere, not to image the land surface in the visible spectrum. But the data it produces has been used for other purposes, for example to measure the amount of land-based vegetation. Since green plants absorb most red light while reflecting near-infrared light, the Normalized Difference Vegetation Index (NDVI), a measure of the difference between the red light intensity of Channel One and near-infrared intensity of Channel Two, has been used to image vegetation density. A high NDVI value indicates productive vegetation while a low NDVI value indicates bare soil, clouds, water or ice. However colors used to distinguish vegetated areas of the Earth from non-vegetated areas are arbitrary and do not represent the true colors of such areas.

There have been attempts to use the AVHRR data to produce color images of land portions of the Earth, but such attempts have been relatively unsuccessful, having failed to accurately model the relationship between land color and available AVHRR data. It is common to create a pixel-based image where each pixel is formed by mixing various levels of red, green and blue (RGB) components. One might use the red spectrum data from Channel One to control the intensity of the red component, NDVI to control the intensity of the green component, and various combinations of AVHRR data to control the intensity of the blue component. However, while the Channel One data accurately indicates the red component, the green component is only loosely related to NDVI and the blue component has not been accurately predicted by any previously known combinations of AVHRR channel data. Thus previous attempts to color images produced based on AVHRR data have provided only poor approximations of the true colors of the Earth. Such failures arise because there is no fixed, single-valued relationship between the limited spectrum radiation represented by AVHRR data and visible spectrum color. Except for its visible red spectrum portion, such radiation does not arise as a result of the land's color but from other characteristics of the land. Differently colored lands can and frequently do produce similar AVHRR radiation patterns.

What is needed is a method for producing high resolution images depicting true colors of land portions of the Earth's surface as accurately as possible from the limited spectrum scan AVHRR data currently provided by the NOAA.

SUMMARY OF THE INVENTION

In accordance with the invention, an imaging system produces an accurately colored image of any desired land portion of the Earth's surface based on its measured red and near infra-red radiation. The area is first scanned by orbiting satellites producing data representing the intensities of its red light radiation between 580 and 680 nanometers in wavelength and its near-infrared light radiation between 725 and 1,100 nanometers in wavelength. With red and near-infrared radiation represented as normalized values C1 and C2, respectively, a Normalized Difference Vegetation Index (NDVI) is then computed for each scanned area, NDVI being a normalized version of the quantity (C2−C1)/(C1+C2). The imaging system then classifies each area of the land in accordance with its C1 and NDVI values. Associating a color with each land class, the imaging system produces an image of the land composed of a set of pixels, each pixel corresponding to a separate area of the land and having the color associated with the class of its corresponding land area. An operator supplies input calibration data controlling the color associated with each land class. By iteratively adjusting the calibration data until colors of portions of the resulting image match known colors of representative samples of the land, the operator can make the system produce an accurately colored image of the entire land area. The imaging system also generates a classification color map display illustrating how the system relates color to land classification based on the input calibration data. The color map display helps the operator to determine how to adjust the calibration data.

It is accordingly an object of the invention to provide a method for producing realistic and aesthetically pleasing, high resolution colored images of land portions of the Earth's surface from data representing limited spectrum red and near-infrared scans of the land.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

Principles of System Operation

The present invention relates to a system for producing realistic color images of land portions of the Earth's surface from data representing limited spectrum (red and near-infrared) scans of the Earth produced by orbiting satellites. The National Oceanic and Atmospheric Administration's (NOAA) Television Infrared Orbiting Satellites (TIROS) include Advanced Very High Resolution Radiometry (AVHRR) packages which are able to scan the entire Earth each day to produce various sensor data streams ("channels") imaging the Earth with a resolution of about 1 kilometer. The AVHRR Channel One (Cl) sensor stream indicates the intensity of light radiation from the Earth in the visible red spectrum between 580 and 680 nanometers in wavelength. The AVHRR Channel Two (C2) scanner stream indicates the intensity of the near-infrared portion of the Earth's radiation between 725 and 1,100 nanometers in wavelength. Other AVHRR channel streams represent various infrared wavelength scans.

Although the AVHRR package scans land portions of the Earth, it was designed primarily to monitor the oceans and the atmosphere, not to provide a visible spectrum image of land. However, in accordance with the present invention, a relatively accurate image of land color is derived in part from the AVHRR C1 and C2 (red and near-infrared) scans. In particular, the present invention models the color of land as a function of its measured C1 value and the Normalized Difference Vegetation Index (NDVI) computed from its measured C1 and C2 values. NDVI is a normalized version of the quantity (C2−C1)/(C1+C2). Since green plants absorb most red light while reflecting near-infrared light, NDVI is an indicator of the amount of vegetation. High NDVI values indicate heavily vegetated land, medium NDVI values indicate partially vegetated land, and low NDVI values indicate bare soil, clouds, water or ice. Though the NDVI value is a relatively accurate indicator of land vegetation, the NDVI value alone is not an accurate indicator of land color.

However in accordance with the present invention, the color of land is ascertained with a relatively high accuracy from a combination of its measured Channel One (C1) and NDVI values and ancillary data.

Figure 1:
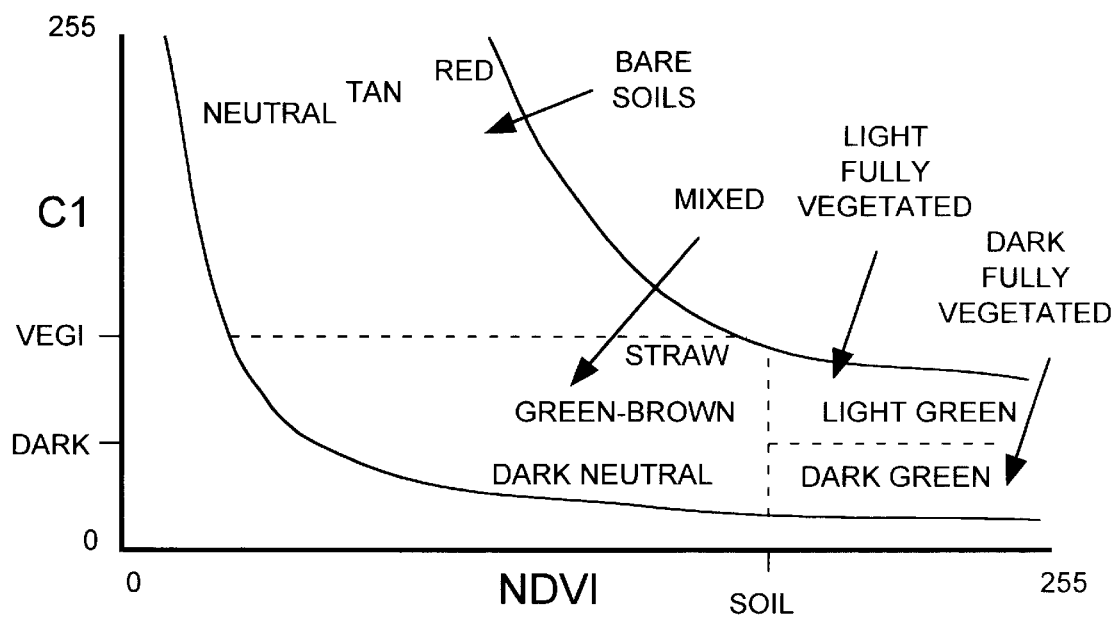
FIG. 1 is a chart of a color map illustrating a relationship between color of a portion of land on the Earth's surface and a combination of its red and near-infrared wavelength light emissions.

FIG. 1 illustrates an empirically established relationship between the color of an example area of land and its C1 and NDVI values. The example area of land includes sections of bare soil, partial vegetation and heavy vegetation. In FIG. 1, the C1 (red light intensity) value of a spot of land is plotted along the vertical axis while its NDVI value is plotted along the horizontal axis. For this example area of land, bare soils exhibit a limited color range dominated by warm colors (reds, tans, neutrals) but may also include yellows, warm browns and grays. FIG. 1 shows that for this area the gamut of bare soil tones map into relatively high C1 values and relatively low NDVI values. Generally as vegetation cover increases, NDVI increases and land color becomes increasingly darker. Fully vegetated lands emit relatively little red light and appear light to dark green in color. These colors map into high NDVI values and low C1 values. Colors of semi-vegetated land (straws, green-browns and dark neutrals) generally map into lower C1 values and mid-range NDVI values. The apparent color of partially vegetated lands viewed from a distance arises from a mixture of colors reflected by bare soil and by the vegetation growing on that soil. Thus (C1,NDVI) values for partially vegetated lands may be best represented by a weighted mixture of the (C1,NDVI) value for the soil and the (C1,NDVI) value of the vegetation growing on it, with the weighting being determined by the relative density of vegetation.

While there exists a relationship between color and NDVI and C1 values as illustrated in FIG. 1, that relationship may vary from region to region. For example, a native plant of England may differ in color from a plant growing in Korea and yet have a similar combination of C1 and NDVI values. Although color certainly influences C1, a measure of the red component of color, C2 radiation may arise from physical attributes of a plant or soil that has little or no relation to attributes that give rise to color. Thus a particular type of plant or soil does not necessarily emit a particular combination of C1 and NDVI radiation because it is a particular color. Nonetheless, similar plants or soils have similar color and produce similar combinations of C1 and NDVI radiation. Thus in a relatively small area having a limited range of plants and soils, all spots of land emitting similar C1 and NDVI radiation levels are likely to have similar types of soils or plants and are therefore likely to be similarly colored. If we have ancillary evidence of the color of one spot of land in that area (or in another similar area) having a particular combination of C1 and NDVI values, then all spots of land in that area having that same particular combination of C1 and NDVI values are likely to have the same color simply because the spots of land are likely to have similar soils and vegetation.

The imaging system of the present invention uses that basic principle to produce a colored image of any desired portion of the Earth's land surface. In the course of creating an image, the imaging system establishes a system of land classification by which each area of imaged land may be assigned to one of several land classes wherein each class of land emits a distinctive pattern of C1 and NDVI radiation intensity. Each land class is characterized as having a unique set of C1 and NTDVI values. The imaged land area is small enough that all spots of land assigned to the same class have similar plants and soils and therefore produce similar C1 and NDVI values. The imaging system allows an operator to associate a color with each land class. The system produces a pixel-based output image in which each pixel corresponds to a separate area of the land. Based on the C1 and NDVI values derived from the TIROS scan data, the system assigns each area of the imaged land to one of those land classes and then colors the area's corresponding pixel with the color of its assigned class.

The operator then views that image and compares it with ancillary color information to gauge the color accuracy of the image. The ancillary data may include, for example, color photographs or visual spectrum scans of representative samples of the imaged land or of similar areas produced by other satellites, spacecraft or aircraft. The ancillary data need not completely cover the area to be imaged, but should preferably cover a number of representative samples of the particular area to be imaged. Also the photographs and scan data should preferably be taken substantially similar times of year. Comparing the photographs or other ancillary color data to the output image, the operator iteratively adjusts the input calibration data so as to produce an accurately colored output land image.

As an aid to the operator, the system displays a classification color map. The color map, essentially a color version of FIG. 1, visually relates the combination of C1 and NDVI values for each land class to the color the system has assigns to each land class. When the operator has chosen an appropriate color for each class the color map will typically include identifiable bands of color that correspond well with various land types. The classification color map helps the operator to establish and understand relationships between color and land classification and to see how his adjustments to the calibration data affect how the system assigns color to the various land classes. In particular, the operator can determine from the color map whether the system is accurately coloring land classes for which accurate ancillary color information is available.

System Topology

Figure 2:
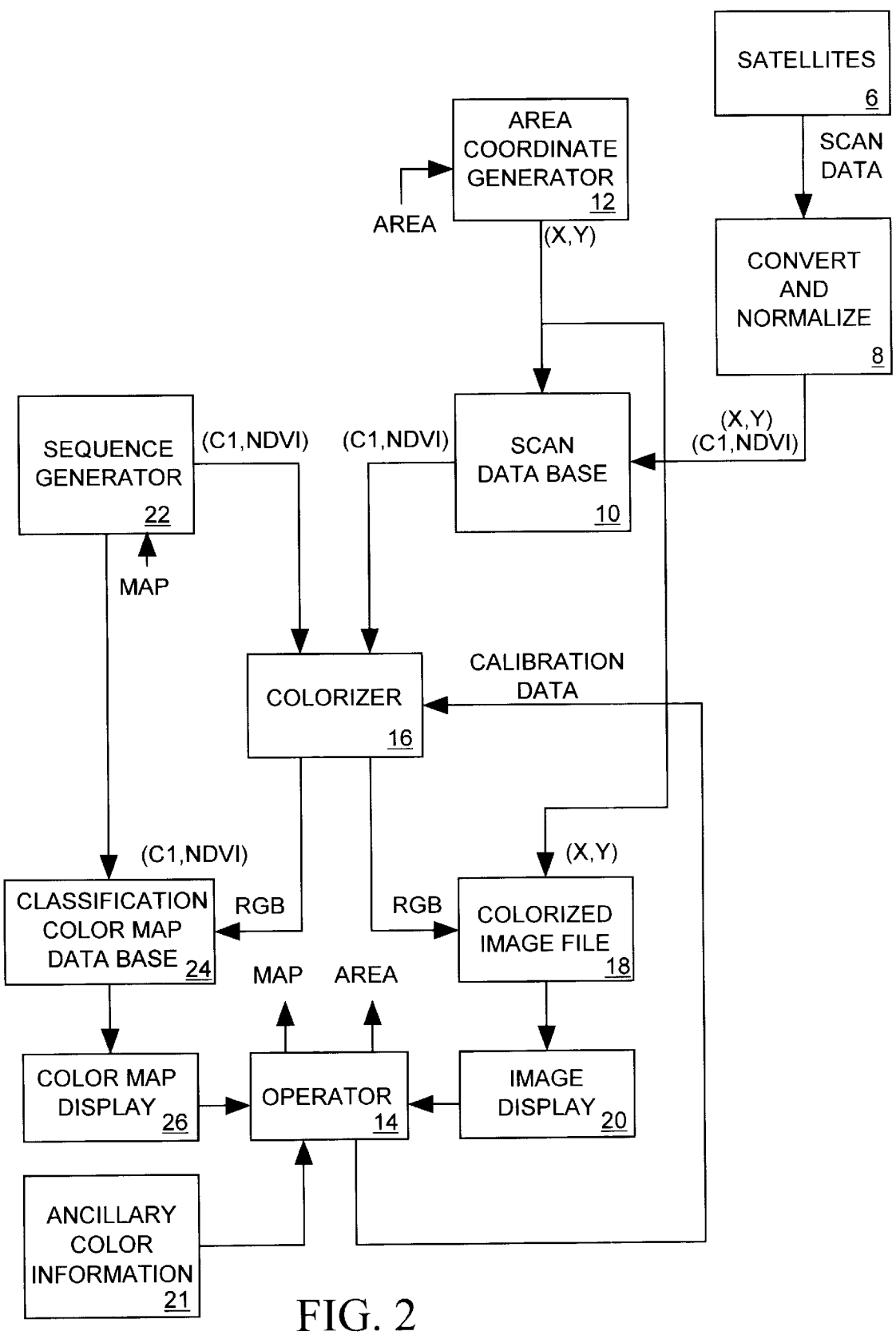
FIG. 2 is a block diagram of a system for producing colored images of land portions of the Earth in accordance with the present invention.

FIG. 2 is a block diagram illustrating the imaging system of the present invention. The color image is derived from the C1 and C2 data produced by the orbiting TIROS satellites 6, C1 and C2 data pairs being normalized representations of high resolution red and near-infrared radiation intensity at various Earth coordinates (X,Y). A simple conversion program 8 converts (C1,C2) values for each (X,Y) coordinate to corresponding (C1,NDVI) values and stores the results in a satellite scan database 10. A given area to be imaged is defined by data included in an AREA command supplied to an area coordinate generator 12 from an operator 14. In response to the AREA command, coordinate generator 12 generates a sequence of all possible (X,Y) coordinate pairs within the area to be imaged. Each (X,Y) coordinate pair of the generator output sequence is applied in turn to data base 10 which outputs the (C1,NDVI) data pair for those coordinates. The (C1,NDVI) pair is applied as input to a colorizer 16.

Based on calibration data supplied by operator 14, colorizer 16 classifies land according to its combination of C1 and NDVI values and assigns an RGB color value to each class of land. When it receives an input (C1,NDVI) pair characterizing a scanned area of land at coordinates (X,Y) colorizer 16 produces as output the RGB value assigned to the land's class. That output RGB value, along with the (X,Y) coordinates supplied as input to colorizer 16, are stored in a colorized image file 18. After all (X,Y) coordinate pairs for the particular area being imaged has been generated and processed, the colorized image file 18 will have stored an RGB value for each (X,Y) coordinate in the imaged area. At that point, a display system 20 reads the data out of image file 18 and generates a pixel-based color display of the imaged area based on that data. The display consists of a set of pixels, each pixel corresponding to a separately scanned area of the land being imaged. Each pixel is positioned on a display screen to represent the (X,Y) coordinates of its corresponding area of land, and each pixel is colored in accordance with the RGB color value assigned to that area's land class.

Colorizer 16 relies on calibration data from operator 14 to control the manner in which it assigns RGB color to land classes. After viewing the colorized land image on display system 20, operator 14 can adjust the calibration data and restart the colorizing process with the AREA command so that the system generates a new image with new colors based on the adjusted calibration data. The operator uses ancillary color information 21 such as photographs or visible spectrum scans of portions of the area being imaged as a gauge to determine the color accuracy of the image produced on display system 20. By iteratively adjusting the calibration data supplied to colorizer 16 and viewing the resulting output image, the operator can discover calibration data settings which cause the system to assign appropriate colors to areas of land for which the operator can ascertain correct colors from the ancillary color information 21. When these areas of land are correctly colored, other areas of land will also likely be accurately colored.

The imaging system employs a set of functions which relate color to land class. The operator-controlled calibration data does not directly assign a color to each land class but rather controls values of various function parameters Thus the operator only indirectly controls color by altering the way the imaging system computes a color to be assigned to each land class. With C1 and NDVI each ranging in value from 0–255, there are too many possible classes and too many fine gradations of hue and intensity from class-to-class for the operator to directly assign a color to each class. Moreover, the ancillary color information typically will not include sufficient information for the operator to directly determine the correct color for every possible class in the area to be imaged. However, if the ancillary data provides color information about a sufficiently representative number of classes, and if the operator adjusts the function parameters so that the output image correctly reflects the known color of those representative classes, then the functions will assign reasonably accurate colors to the classes for which ancillary color information is not available.

At any time during the iterative color adjustment process, operator 14 may command the system to display a classification color map to aid the operator in visualizing how colorizer 16 assigns colors to land classes based on the calibration data supplied by the operator. To do so, operator 14 transmits a MAF command to a (C1,NDVI) sequence generator 22. In response to the MAP command, generator 22 produces an output sequence of all possible (C1,NDVI) pair values. Colorizer 16 converts the (C1,NDVI) pair sequence to a sequence of corresponding RGB color values using the same color assignment functions it uses to create the land image, as controlled by the current operator-supplied calibration data. That RGB color data sequence is stored in a classification color map database 24 in which RGE value of the sequence is indexed in accordance with its corresponding (C1,NDVI) pair output of sequence generator 22. A second display system 26 reads the data out of database 24 and displays a color map similar to a colorized version of FIG. 1. The color map illustrates how colorizer 16 is currently assigning color to each (C1,NDVI) land class. This color map display helps the operator to correctly adjust the calibration data because the operator can easily see on the color map whether the system is correctly assigning color to land classes for which correct color is known from ancillary color information 21. The color map display also gives the calibration data graphical significance and enables the operator to gauge how changes in calibration data affects color.

Colorizer Operation

Figure 3:
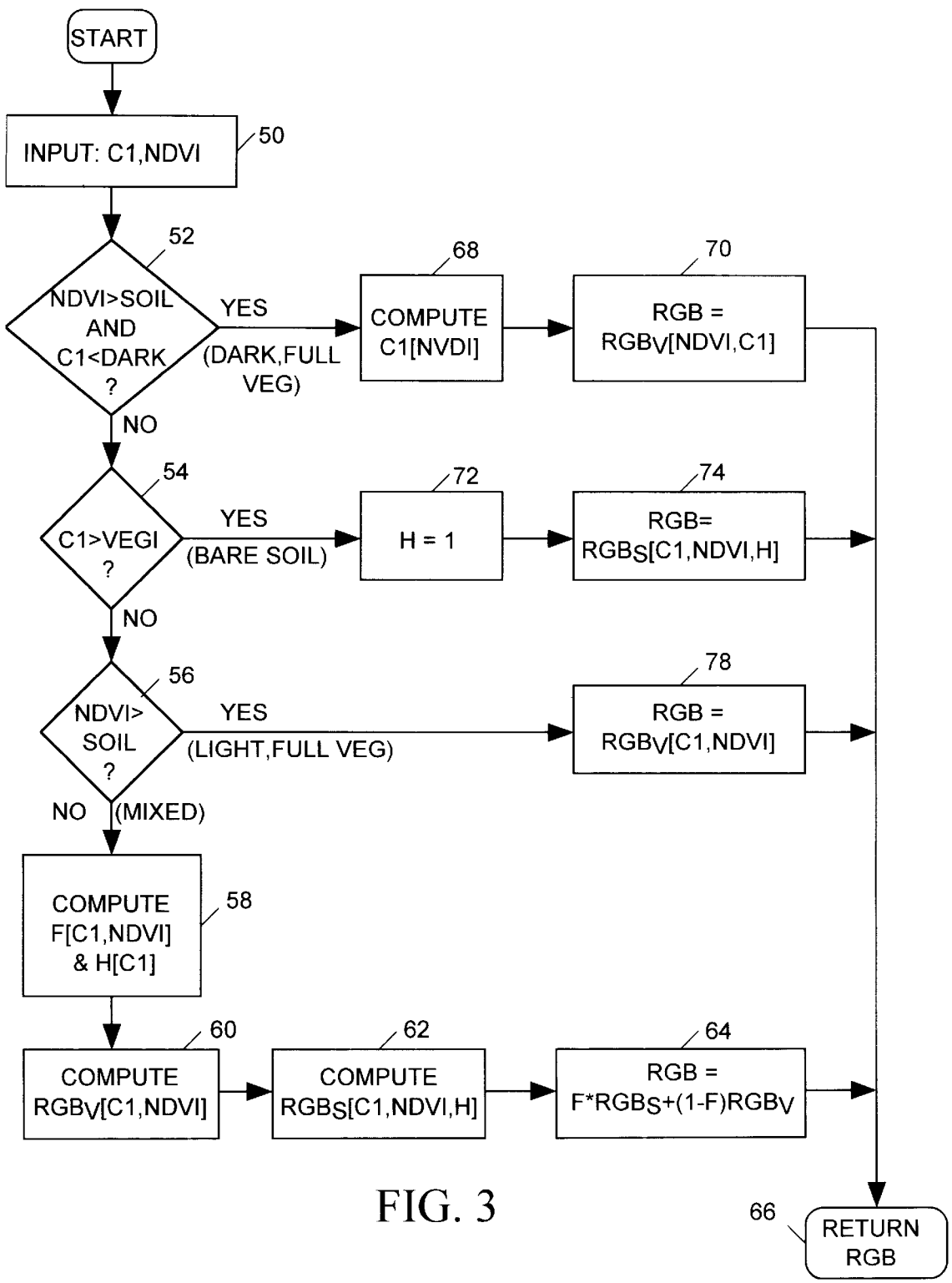
FIG. 3 is a flow chart for a program implementing the colorizer of FIG. 2.
Figure 4:
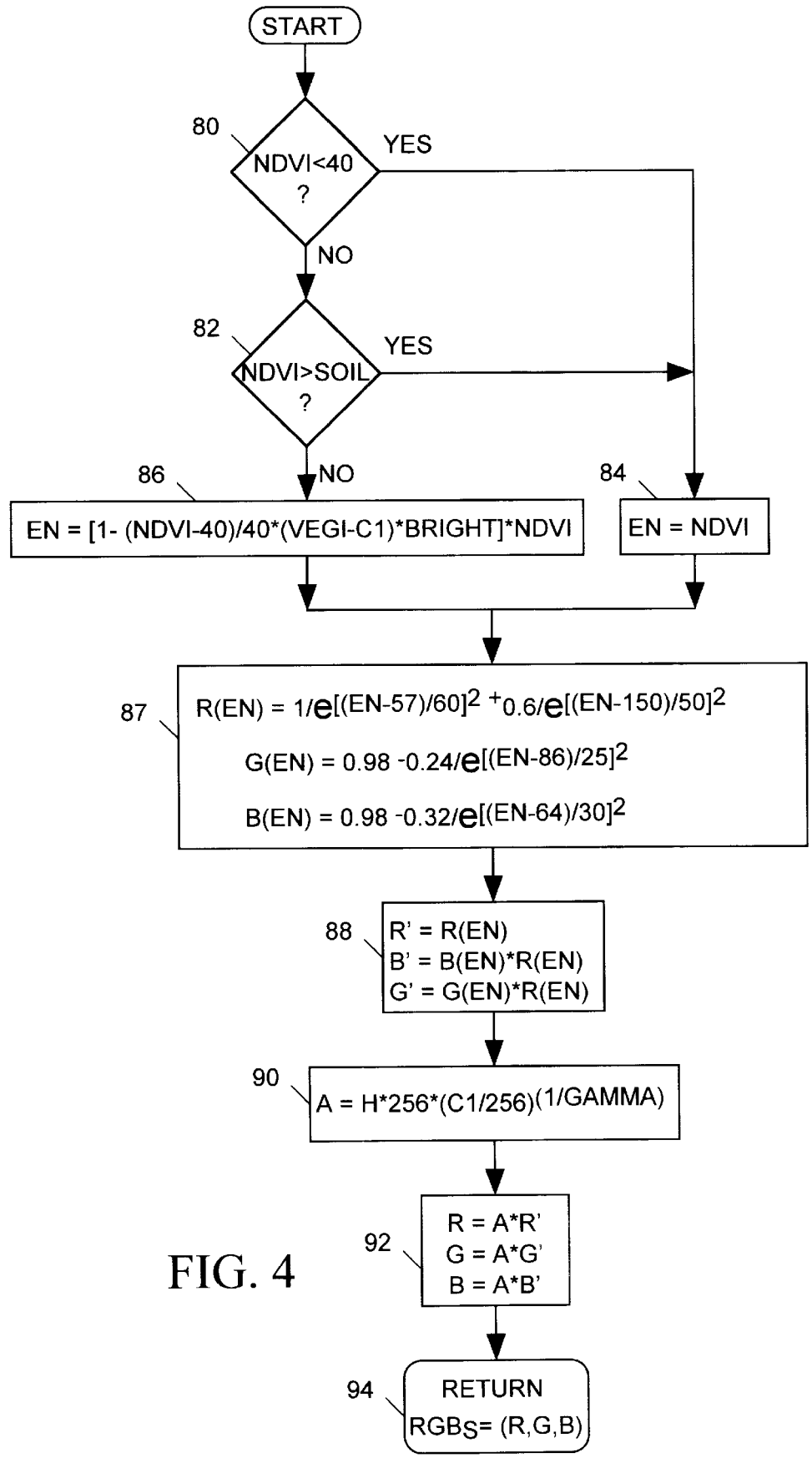
FIG. 4 is a flow chart of a program for implementing a soil colorization function.

FIG. 3 is a flow chart illustrating operation of colorizer 16 of FIG. 2. A color may be characterized as having both hue and intensity. A color's intensity increases with the intensities of its red, green and blue (R, G and B) components. A color's hue is determined by the relative intensity of its R, G, and B components. For example an RGB color (R,G,B)= (200, 110, 150) has the same hue as RGB color (20,11,15) but is much brighter (i.e., has higher intensity). In producing its RGB color output, the colorizer 16 of FIG. 3 separately determines the color's hue and intensity from the (C1, NDVI) input and then multiples hue by intensity to attain an output RGB color.

Figure 5:
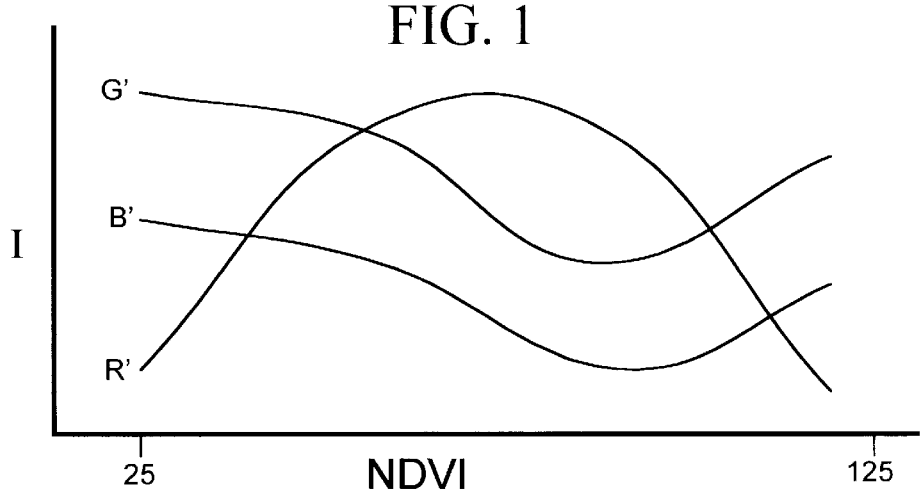
FIG. 5 is a graph of color component intensity as a function of NDVI for soil.
Figure 6:
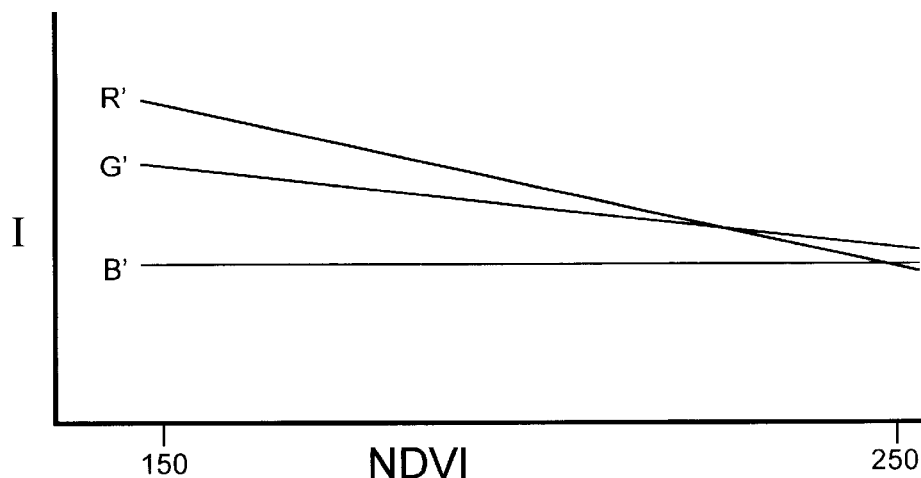
FIG. 6 is a graph of color component intensity as a function of NDVI for vegetation.

The nature of the relationship between NDVI and color differs depending on whether soil or vegetation is scanned. FIG. 5 illustrates a typical relationship between NDVI and relative R,G, B component intensities (I) for bare soil areas for a given C1 value at a particular area of the Earth. FIG. 6 illustrates a typical relationship between NDVI and R,G, B component intensities for fully vegetated land for a given C1 value in some particular area. Since the nature of the relationship between color and (C1,NDVI) scan data differs depending on whether soil or vegetation is being scanned, the colorizing program uses a different set of functions to relate (C1,NDVI) value to RGB color for land classified as bare soil than it uses for land classified as fully vegetated. For land having a mix of soil and vegetation, a contribution to apparent color arises from both soil and vegetation in relative proportion to the amount of vegetation coverage. Thus for partially vegetated areas, the colorizer uses both sets of functions to compute two separate RGB values from an input (C1,NDVI) pair and then produces an output RGB value as a weighted combination of the computed soil and vegetation RGB values. A weighting factor F (the relative weight given to the vegetation value) is a function of C1 and NDVI. Since vegetation has high NDVI values and low C1 values, the weighting factor F increases with NDVI and decreases with C1.

For most land classes, the C1 value, while directly indicating only the red spectrum intensity, is normally also a good indicator of full visible spectrum radiation intensity. Thus the colorizer normally uses the C1 value as the predominant measure of color intensity. However for dark, heavily vegetated land having high NDVI and low C1 values, C1 is not a good measure of full visible spectrum intensity, and the colorizer uses NDVI only as a measure of intensity.

Thus in the course of producing an output color for a given input pair (C1,NDVI), the colorizer initially classifies land into four major types based on its C1 and NDVI values:

1. Dark, fully vegetated,
2. Light, fully vegetated,
3. Mixed bare soil and vegetation,
4. Bare soil.

The colorizer does this because it has established a different set of functional relationships between (C1,NDVI) value and RGB color for land within these classifications. As discussed below, the basis upon which colorizer 16 assigns land to these classes as well as the (C1,NDVI)RGB color functional relationships for each class are controlled by the calibration data supplied by operator 14.

Colorizer 16 of FIG. 2 is suitably implemented as a computer program illustrated by the flow chart of FIG. 3. Referring to FIG. 3, the colorizer initially acquires an input (C1,NDVI) data pair (step 50) and then determines from the NDVI and C1 values whether the land at coordinates (X,Y) can be classified as dark, fully vegetated (step 52). Dark, fully vegetated land is associated with a combination of relatively high NDVI values and low C1 values. SOIL and DARK parameters, included in the calibration data supplied by the operator, respectively indicate the lower and upper NDVI and C1 limits for dark, fully vegetated land. When unable to classify the land as dark, fully vegetated the colorizer next tries to classify the land as bare soil (step 54). Bare soil has a relatively high C1 value, above a limit set by a VEGI parameter also supplied by the operator. When it cannot classify the land as bare soil, the colorizer tries to classify the land as light, fully vegetated (step 56). Light, fully vegetated land has an NDVI value above SOIL but does not have a C1 value below DARK.

When the colorizer cannot otherwise classify the land as bare soil or fully vegetated, it classifies the land as a mixture of soil and vegetation. In such case, the colorizer computes an intensity factor H, a function of C1, and a weighting factor F, a function of NDVI and C1 (step 58). As discussed below, the operator-supplied calibration data also influences the computations of intensity and weighting factors H and F. The colorizer then evaluates a soil colorization function $RGB_s[C1,NDVI,H]$ (step 60) and a vegetation colorization function $RGB_v[C1,NDVI]$ (step 62) to compute both soil ($RGB_s$) and vegetation ($RGB_v$) RGB color values. The soil colorization function $RGB_s[C1,NDVI,H]$ establishes a relationship between (C1,NDVI) and RGB color for bare soil land while the vegetation colorization function $RGB_v$ establishes a relationship between (C1,NDVI) and RGB color for fully vegetated land. Thus after the land is classed as a mixture of bare soil and vegetation, an RGB color is computed using both relations at steps 60 and 62. The colorizer then generates an a single output RGB value as a weighted combination of the computed $RGB_s$ and $RGB_v$ values using F as the weighting factor (step 64). The weighting factor indicates vegetation density and gives more weight to the vegetation type RGB value as vegetation density increases. The computed RGB value computed at step 64 is returned at step 66.

For dark, fully vegetated land, the C1 value is small and has little relation to color intensity or hue of the vegetation. C1 in this case may be more influenced by atmospheric haze than land color. Thus if the colorizer determines at step 52 that C1 is low and NDVI is high, it classifies the land as dark, fully vegetated and replaces the C1 value with a "pseudo" C1 value C1[NDVI], a function of NDVI (step 68). The colorizer then computes the vegetation $RGB_v$ value using the same function employed in step 62, and sets the output RGB value equal to $RGB_v$ (step 70). The colorizer thereafter returns the output RGB value (step 66). Note that in the computation of $RGB_v$ at step 62 the actual value of C1 was used, whereas in the computation of $RGB_v$ at step 70, a pseudo value of C1 was used.

When at step 54, the value of C1 is found to be sufficiently high, the land is classified as bare soil type. In that case, the intensity factor H is set equal to 1 (step 72) and the output RGB value is determined by evaluating the soil-type colorizing function $RGB_s[C1,NDVI,H]$ (step 74). The $RGB_s$ function employed at step 74 is similar to that employed at step 62 but the value of the intensity H factor differs; at step 74 H is 1 whereas at step 58, H is a function of C1 and may be smaller than 1. Since bare soil is normally brighter than vegetated land, and its atmosphere is less hazy, it is not necessary to limit intensity by making H a function of C1. However in mixed vegetation areas, where the relative proportion of bare soil contributes to C1 intensity, color intensity of the soil component is more appropriately made a function of C1.

When at step 56, the value of NDVI is found to be higher than SOIL, with C1 not particularly low, the land is classed as light, fully vegetated. In this case the RGB output value is determined by evaluating the $RGB_v[C1,NDVI]$ function alone (step 78) and the result returned at step 66.

Note that the computations at steps 60, 70 and 78 all use the same set of vegetation type functions. However for mixed soils, the vegetation type $RGB_v$ value is only a weighted component of output RGB value while for dark and light full vegetation types, the $RGB_v$ value is the sole component of output RGB value. Similarly, though the functions used to compute soil type $RGB_s$ in steps 74 and 62 are similar, the computed bare soil RGB value computed at step 64 is only a weighted component of output RGB value whereas the bare soil RGB value computed at step 74 is the sole component of output RGB value. Recall also the differences in intensity values used at steps 74 and 62.

Preliminary Classification

As described above, the colorizer of FIG. 3 chooses from among four different functions relating a (C1,NDVI) pair to an output RGB color, and classifies each scanned point land according to one of four types in order to choose the appropriate function. These classifications are based on threshold levels for C1 and NDVI values used in steps 52, 54, 56 and 58. Those threshold levels are set by various function constants (SOIL, DARK, and VEGI) provided as part of the calibration data from the operator. Table 1 below lists the classification tests for each land type.

TABLE 1

| Test | Classification |
|---|---|
| NDVI > SOIL, C1 < DARK | dark, full vegetation |
| NDVI > SOIL, DARK < C1 < VEGI | light, full vegetation |
| NDVI < SOIL, C1 < VEGI | mixed soil, vegetation |
| C1 > VEGI | bare soil |

Values for the DARK, VEGI and SOIL parameters are all region dependent. The SOIL, DARK and VEGI parameters are illustrated in FIG. 1 which is similar to the classification color map produced by display system 26 of FIG. 2. These parameters act as dividing lines between parts of the color map corresponding to the four classifications. Thus the displayed classification color map gives the operator visual feedback as to how his choice of threshold data and other parameters affects the way the system assigns color to the various classes of land. As the calibration data is iteratively adjusted, the various classes of land will appear as identifiable areas of the color map.

Soil Color Function $RGB_s$

FIG. 6 illustrates a routine for calculating RGB color $RGB_s$ for soil in steps 62 and 74 of FIG. 3. If NDVI is less than 40 (step 80) or is greater than SOIL (step 82), then a hue factor EN (EQUIVALENT NDVI) is set equal to NDVI (step 84). Otherwise the EN factor is computed (step 86) as

EN=[1-(NDVI-40)/(40*(VEGI-C1)*BRIGHT)]*NDVI.

The BRIGHT parameter is included in the calibration data supplied by the operator. After computing the EN factor, the program computes the relative intensities of the R,G and B components (R',G' and B') as functions of EN as illustrated in steps 87 and 88. Color intensity A is next computed as a product of intensity factor H and a gamma correction function of C1 (step 90). The R, G, and B component intensities are then calculated as products of A and the corresponding relative component intensities R',G' and B' (step 92). The resulting value $RGB_s$=(R,G,B) is returned at step 94.

Note that for soil, the output color's hue (R',G',B') computed at steps 80–86 is a function of both NDVI and C1, whereas the color's intensity (A) computed at step 96 is a function of C1 alone. Note also that user-supplied calibration parameters influence both intensity and hue.

Vegetation Color Function $RGB_v$

Figure 7:
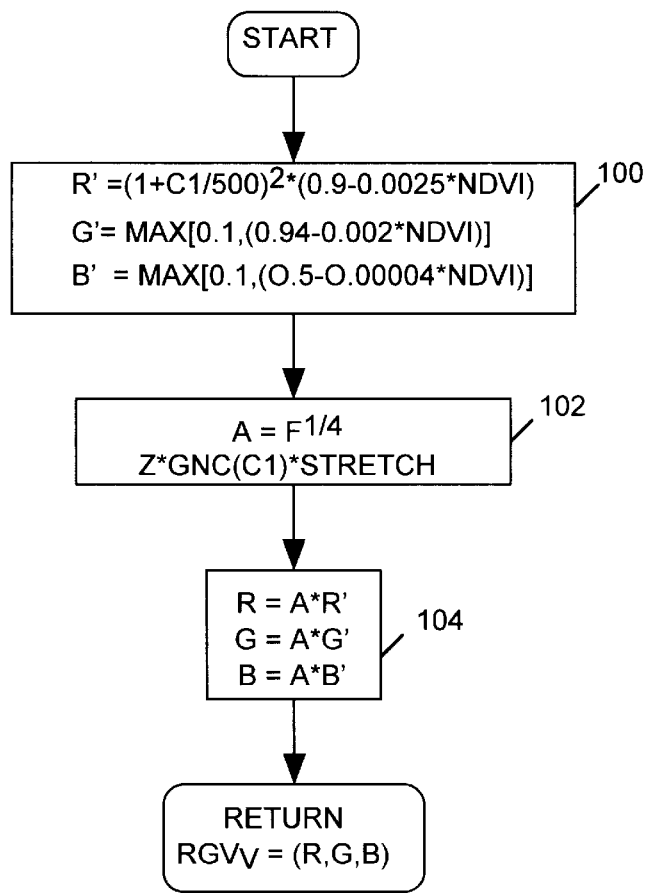
FIG. 7 is a flow chart of a program for implementing a vegetation colorization function.

FIG. 7 illustrates a routine for calculating RGB color $RGB_v$ for vegetation in steps 60 and 78 of FIG. 3. The hue (R',G',B') of the RGB vegetation color is computed at step 100. The relative intensity R' of the red component is a function of both C1 and NDVI:

$$R'=(1+C1/500)^2*(0.9-0.0025*NDVI)$$

The relative intensities G' and B' of the red and blue components depend only on NDVI. G' is set to the larger of 0.1 and 0.94− 0.002*NDVI. B' is set to the larger of 0.1 and 0.5–00004*NDVI. The color intensity factor (A) is computed at step 102 as:

$$A=F^{1/4}GNC[C1]*STRETCH$$

where F is the weighting factor computed at step 58. The GNC[] function is a gamma brightness function. STRETCH is a parameter supplied by the operator. Note that A increases both with the weighting factor F and with C1.

The vegetation R, G and B component values of the output $RGB_v$ color are computed at step 104 as the product of intensity (A) and relative intensities (R',G',B'). Note that hue (R',G',B') is largely dependent on NDVI with C1 affecting only the red component. For dark, full vegetation, since a pseudo C1 value is derived from NDVI at step 68 of FIG. 3, the relative red intensity depends only on NDVI.

Weighting Function (F) and Intensity Function (H)

Figure 8:
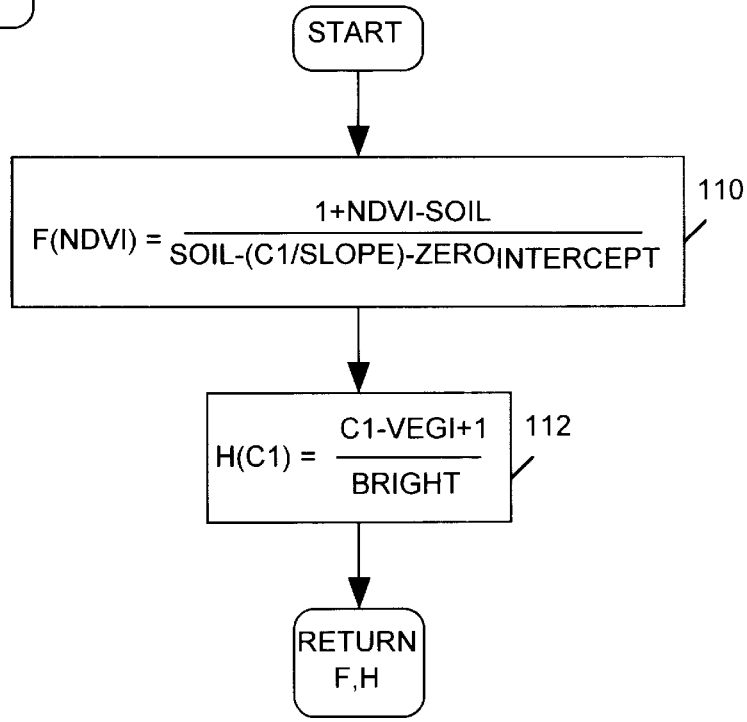
FIG. 8 is a flow chart of a program for computing a weighting and an intensity factor.

FIG. 8 depicts a routine for computing the weighting factor F and the intensity factor H carried out at step 58 of FIG. 3 used when establishing color for land classified as partially vegetated (mixed vegetation and bare soil). The weighting function F, computed at step 110 of FIG. 8 as:

$$F(C1, NDVI) = \frac{1 + NDVI - SOIL}{SOIL - \left(\frac{C1}{SLOPE}\right) - ZERO_{INTERCEPT}}$$

F increases with increasing NDVI to give more weight to the vegetation color $RGB_v$ and decreases with increasing C1 to give more weight to soil color $RGB_s$. The intensity function H, computed at step 112, controls soil color intensity. The intensity function increases with C1, thereby increasing the relative contribution of soil to mixed land color. The SOIL, SLOPE, $ZERO_{INTERCEPT}$, VEGI and BRIGHT constants employed at steps 110 and 112 are calibration data supplied by the operator.

Regional and Seasonal Variation

To obtain accurately colored images, the calibration data the operator supplies to colorizer 16 has to be appropriately adjusted for each region to be imaged. For example calibration parameters that produce an accurate image of a North American desert area vary from parameters that produce an accurate image of an African desert area. The difference is due primarily to differences in soil and mineral types which influence the color of bare land. Of course there is a fixed relationship between soil type and color. A tray of dry sand does not change color when we move it from North America to Africa. There is also a strong relationship between soil type and (C1,NDVI) value. That tray of dry sand will always produce the same set of C1 and NDIV values no matter where it is. But there is no immutable relationship between (C1,NDVI) and color that applies equally everywhere on earth. Two different types of plants or soil having different colors may produce similar (C1,NDVI) values. Fortunately, if we sufficiently limit the size of the area the imaging system is asked to map, we substantially reduce the likelihood that the area will include differently colored plants or soils producing similar (C1,NDVI) values.

It is equally true that the calibration data the operator supplies to colorizer 16 has to be appropriately adjusted for seasonal variations. For example sand that is dry in the summer may change color when it gets wet in the winter while its dampness may or may not influence its measured (C1,NDVI) value. Vegetation changes color with changes in season, and where plants lose foliage in winter, the relative influence of soil characteristics on land color increases. Thus it is important to use C1,NDVI scan data acquired at a particular time year of interest, and that the operator gauges color accuracy using ancillary color information acquired at that particular time of year.

An operator may not always have sufficient ancillary color information to gauge the color accuracy of an image of a particular area of interest at a particular season. However the operator may have sufficient ancillary color information to use the system to produce an accurate image of another area that is similar to the particular area of interest in terms of climate, season, soils, vegetation and the like. In such case, the operator can use the imaging system to first produce an accurately colored image of the area for which adequate ancillary color information is available. Without changing the calibration data values established when producing the first image, the operator can then apply the scan data for the area of interest to the imaging system. The system will then produce an image of the area of interest based on the same calibration data. Since the two areas have similar types of soils and plants, the colors in two images will be similarly accurate.

Other Applications

As illustrated above, the imaging system of the present invention may be used to produce an image of a selected land area based on the TRIOS scan data, wherein the color of each pixel of the image can be adjusted to reflect the color of a corresponding spot of land. The imaging system may be thought of as a tool which helps an operator to empirically establish a system of land classification, wherein each land class is associated with a distinctive set of scan values, and wherein the operator may assign an appropriate color to each land class.

However the imaging system can be used as a tool to help the operator classify land for purposes other than to assign color. For example the system could be used to classify bare land by soil type or mineral content. In such case, with an appropriately selected combination of scan data, and with the colorizer adapted to implement appropriately selected scan data-to-RGB conversion functions, and using ancillary information regarding mineral content in selected samples of the imaged land, an operator could adjust the calibration data so that mineral content is represented by a desired range of colors. Areas of similar mineral content would be represented by similar colors. Thus while the imaging system of the present invention works well for color mapping the Earth, a system of similar topology and methodology but using different scan, ancillary information and/or conversion functions could be employed to classify and map land for other purposes.

Thus has been shown and described an imaging system which in its preferred embodiment may be used for generating an accurately colored image of land areas of the Earth based on data representing comprehensive red and near-infrared scans of the Earth from orbiting satellites and on ancillary color information derived from photographs of representative land samples. While the forgoing specification has described preferred embodiment(s) of the present invention, one skilled in the art may make many modifications to the preferred embodiment(s) without departing from the invention in its broader aspects. The appended claims therefore are intended to cover all such modifications as fall within the true scope and spirit of the invention.

What is claimed is:

1. A method for creating an image of land the image comprising a set of colored pixels wherein a color of each pixel represents a color of a separate corresponding area of the imaged land, the method comprising the steps of:
    a) establishing a system of land classification by which each area of the imaged land can be assigned to one of a plurality of land classes, wherein each land class emits a distinctive pattern of radiation within a limited range of frequencies;
    b) measuring the pattern of said radiation emitted by each separate area of the imaged land;
    c) assigning each separate area of the imaged land to one of said plurality of land classes in accordance with the area's measured pattern of said radiation;
    d) enabling an operator to associate a color with each land class; and
    e) coloring each pixel of said image with the color associated with the assigned land class of its corresponding land area.

2. The method in accordance with claim 1 wherein said classification system distinguishes between bare and vegetated lands.

3. The method in accordance with claim 1 wherein said classification system distinguishes between areas of bare land having differing soil types.

4. The method in accordance with claim 1 wherein said classification system distinguishes between areas of land having differing amounts of vegetation coverage.

5. A method for creating an image of land, the image comprising a set or colored pixels wherein a color of each pixel represents a color of a separate corresponding area of the imaged land, the method comprising the steps of:
    a) establishing a system of land classification by which each area of the imaged land can be assigned to one of a plurality of land classes, wherein each land class emits a distinctive pattern of radiation within a limited range of frequencies including only frequencies external to a substantial portion of a visible spectrum, wherein all land of a similar class has a similar color;
    b) measuring the pattern of said radiation emitted by each separate area of the imaged land;
    c) assigning each separate area of the imaged land to one of said plurality of land classes in accordance with the area's measured pattern of said radiation;
    d) enabling the operator to associate a color with each land class; and
    e) coloring each pixel with the color associated with the assigned land class of its corresponding land area.

6. The method in accordance with claim 5 wherein step d comprises the substeps of:

d1) allowing the operator to establish a function relating radiation pattern to color in a manner determined by calibration data; and d2) evaluating said function to associate a color with each class.

7. The method in accordance with claim 5 wherein said limited range of frequencies consists of red light radiation and near-infrared light radiation frequencies.

8. The method in accordance with claim 7 wherein said red light radiation has a wavelength between approximately 580 and 680 nanometers and wherein said near-infrared radiation has a wavelength between approximately 725 and 1100 nanometers.

9. A method for creating an image of land, the image comprising a set of colored pixels wherein each pixel represents a color of a separate corresponding area of the imaged land, the method comprising the steps of:

a) establishing a system of land classification by which each area of the imaged land can be assigned to one of a plurality of land classes, wherein each land class emits a distinctive pattern of radiation within a limited range of frequencies wherein all land of a similar class has a similar color;

b) measuring the pattern of said radiation emitted by each separate area of the imaged land;

c) assigning each separate area of the imaged land to one of said plurality of land classes in accordance with the area's measured pattern of said radiation;

d) associating a color with each land class; and e) coloring each pixel with the color associated with the assigned land class of its corresponding land area, wherein said limited range of frequencies includes only frequencies external to a substantial portion of the visible light spectrum, wherein said limited range of frequencies consists of red light radiation and near-infrared light radiation frequencies and, wherein said radiation pattern is represented by a combination of C1 and NDVI values where NDVI is a number proportional to the quantity (C2−C1)/(C1+C2), wherein C1 is an intensity of said red light radiation and C2 is an intensity of said near-infrared light radiation.

10. An apparatus for assisting an operator to create an image of land, the image comprising a set of colored pixels wherein a color of each pixel represents a color of a separate corresponding area of the imaged land, the apparatus comprising:

scanning means for scanning areas of the land to produce a first sequence of scan data values. each representing a radiation pattern of each said area of said imaged land within a limited range of frequencies including only frequencies external to a substantial portion of a visible spectrum;

processing means for receiving said first sequence from said scanning means and calibration data from said operator as input, and for evaluating a function for each input scan data value of said first sequence, the function embodying a system of land classification by which each area of the imaged land can be assigned to one of a plurality of land classes, wherein each area of land assigned to each land class emits a distinctive pattern of radiation within said limited range of frequencies, the function relating the distinctive radiation pattern of each class to color in a manner determined by said calibration data and producing output color data representing the related color, said processing means thereby producing an output sequence of color data values in response to said first sequence of scan data values; and first display means for receiving said color data value sequence produced by said processing means and producing said image in response thereto.

11. The apparatus in accordance with claim 10 wherein said first display means colors each separate pixel of said image in accordance with a separate color data value of said color data value sequence.

12. The apparatus in accordance with claim 10 further comprising:

sequence generating means for supplying a second sequence of scan data values to said processing means such that said processing means produces a second sequence of color data values in response thereto, and second display means for receiving said second sequence of scan data values and said second sequence of color data values and producing therefrom a classification color map display representing the manner in which said processing means relates color to scan data value.

13. The apparatus in accordance with claim 10 wherein said limited range of frequencies consists of red light radiation and near-infrared light radiation frequencies.

14. A method for enabling an operator to create an image of land, the image comprising a set of colored pixels wherein a color of each pixel represents a color of a separate corresponding area of the imaged land, the method comprising the steps of:

a) establishing a set of preliminary land classifications relative to amount of vegetation appearing on the land;

b) enabling the operator to establish A set of colorizing functions, each colorizing function corresponding to a separate one of said preliminary land classifications, each colorizing function relating land color to a distinctive pattern of radiation within a limited range of frequencies including only frequencies external to a substantial portion of the visible spectrum;

c) measuring a pattern of said radiation emitted by each separate area of the imaged land;

d) assigning each separate area to one of said plurality of preliminary land classifications in accordance with the area's measured pattern of said radiation;

e) determining a color for each separate area by evaluating the colorizing function corresponding to its assigned land classification; and f) coloring the pixel corresponding to each separate area with the area's determined color.

15. The method in accordance with claim 14 further comprising the steps of:

acquiring calibration data from said operator, and establishing said preliminary land classifications in accordance with said calibration data.

16. The method in accordance with claim 15 wherein said colorizing functions include parameters having values controlled by the acquired calibration data such that values of the calibration data influence how said functions relate land color to said distinctive pattern of radiation.

17. The method in accordance with claim 14 wherein said limited range of frequencies consists of red light radiation having a wavelength between approximately 580 and 680 nanometers and near-infrared radiation having a wavelength between approximately 725 and 1100 nanometers.

18. A method for colorizing an image of land, the image comprising a set of pixels wherein each pixel represents a separate corresponding area of the imaged land, the method comprising the steps of:

a) measuring a pattern of radiation emitted by each area of said land within a limited range of frequencies including only frequencies external to a substantial portion of the visible spectrum;

b) generating a color correlation map representing a smoothly varying relationship between color and the pattern of emitted radiation within said limited range of frequencies;

c) coloring each pixel of said image in accordance with the relationship represented by said color correlation map and the measured pattern of radiation within said limited range of frequencies emitted by an area of said land corresponding to the pixel;

d) enabling a control system to adjust the color correlation map and the relationship it represents; and e) altering colors of pixels of said image in accordance with the relationship represented by said color correlation map as adjusted by said control system.

19. The method in accordance with claim 18 wherein said control system adjusts said color correlation map and the relationship it represents at step d so that colors of pixels are altered at step e to match known colors of land areas corresponding to said pixels.

20. The method in accordance with claim 18 wherein said control system adjusts said color correlation map in response to input calibration data provided by an operator.

21. The method in accordance with claim 20 further comprising the step of displaying said color correlation map.

22. The method in accordance with claim 18 wherein said land is the surface of a planet.

23. The method in accordance with claim 22 wherein said planet is Earth.

* * * * *